B. Wright,

Washing Machine,

No. 2,370. Reissued Oct. 2, 1866.

Witnesses:
John P. Jacobs
J. B. Mills

Inventor:
B. Wright
By C. M. Alexander Atty.

N. PETERS, PHOTO-LITHOGRAPHER, WASHINGTON, D. C.

UNITED STATES PATENT OFFICE.

BENJAMIN WRIGHT, OF HUDSON, MICHIGAN.

IMPROVED WASHING-MACHINE.

Specification forming part of Letters Patent No. 47,062, dated March 28, 1865; Reissue No. 2,370, dated October 2, 1866.

*To all whom it may concern:*

Be it known that I, BENJAMIN WRIGHT, of Hudson, in the State of Michigan, have invented certain new and useful Improvements in Washing-Machines; and I do hereby declare that the following is a full, clear, and exact description of the same, reference being had to the accompanying drawings and to the letters of reference marked thereon.

In the annexed drawings making part of this specification—

Figure 1:
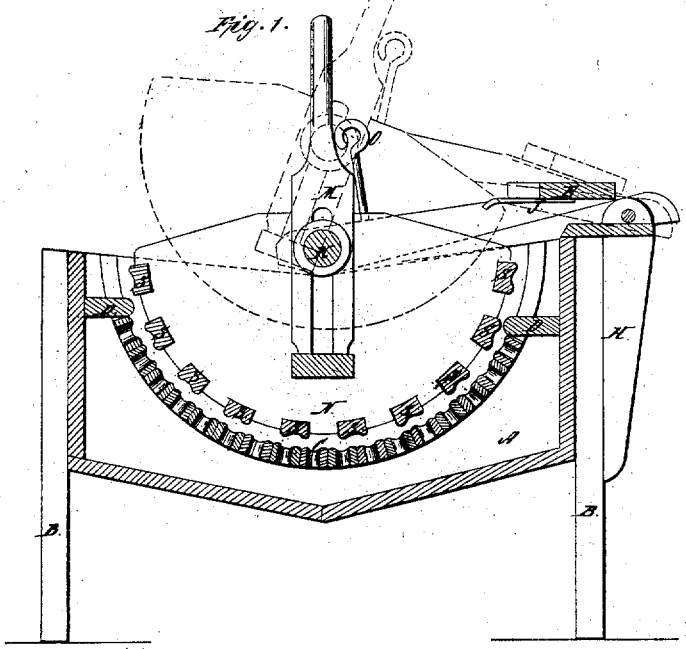
Figure 2:
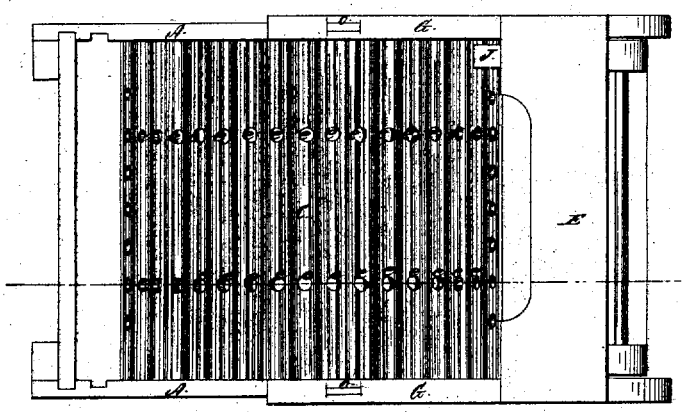

Figure 1 represents a longitudinal vertical section of my machine. Fig. 2 is a plan view with rocker removed.

The body of my machine consists of the oblong tub or box A, supported by the legs B B. The sides of the box A are made to taper slightly from their ends to their centers, in order to adapt the bottom of the said tub or box to the convex surface of the rubber C.

The rubber C is constructed with corrugations on its concave surface, which are at right angles with the sides of the tub or box A, and are distant about half an inch from each other. Between each pair of these corrugations there are two holes made, one near each end of the space between the two corrugations.

The two series of holes, (marked *e*,) are parallel to the sides of the rubber C. Near each end of rubber C there are similar perforations, running at right angles with the sides of said rubber, and through the last-mentioned perforations the dirty water is driven by the action of the rocker N, while the holes at the bottom of rubber C admit clean water.

The space between the rubber and the bottom of the box will be about six inches.

The rocker N, above referred to, operates immediately above the rubber C, its ends terminating with the boards D, which are fastened to the sides of the tub or box A.

The bottom edges of the side pieces of rocker N are convex, and are tied together by the fluted slats *s s*. G represents two arms placed over the two sides of tub A, and extending from a little beyond the ends of the tub to a point past the center of the sides of said tub. The arms G are bound together by means of board E near their outer end, and are hinged to the supports H by means of an iron rod which passes through both arms and through said supports H, the supports H being permanently fastened to the legs B.

By this arrangement the rocker can be thrown back so that the article to be washed can be placed on the rubber C, for it will be remarked that the shaft K of rocker N is pivoted in arms G, and consequently partakes of the motion of the said arms.

The center of shaft K is cut down to receive the forked handle M by which the rocker N is operated.

The board E, which binds the arms G together, has pivoted to its under side a metal latch, J, which operates immediately above one of the sides of rocker N. By turning the latch J over the side of rocker N it will arrest the motion of said rocker in that direction, and this can be done when there is but a single garment to be washed and a diminished motion of the rocker is required.

The machine is operated by the handle M, as above described.

O O represent two thumb-screws passing through the arms G, by the operation of which rocker N can be raised or lowered, and thus adapted to the quantity of clothes to be washed.

Having thus fully described my invention, what I claim is—

1. The rocker N and arms G, constructed and used with the box A, substantially as and for the purpose herein specified.

2. The arrangement of the box A with the rubber C, raised above its bottom, when used with the rocker N and arms G, as and for the purpose specified.

As evidence that I claim the foregoing I have hereunto set my hand in the presence of two witnesses.

BENJAMIN WRIGHT.

Witnesses:

J. J. HOGABOOM,

O. W. HEWITT.